(12) United States Patent
Nakajima

(10) Patent No.: US 7,120,163 B2
(45) Date of Patent: Oct. 10, 2006

(54) MULTIPLEXING APPARATUS AND METHOD, IMAGE OUTPUT APPARATUS AND METHOD, AND RECORDING MEDIUM

(75) Inventor: Yasuhisa Nakajima, Kanagawa (JP)

(73) Assignee: Sony Corporation, (JP)

( * ) Notice: Subject to any disclaimer, the term of this patent is extended or adjusted under 35 U.S.C. 154(b) by 1007 days.

(21) Appl. No.: 09/930,074

(22) Filed: Aug. 15, 2001

(65) Prior Publication Data

US 2002/0044572 A1   Apr. 18, 2002

(30) Foreign Application Priority Data

Aug. 18, 2000  (JP)  ............................ P2000-248493

(51) Int. Cl.
*H04J 3/16* (2006.01)
(52) U.S. Cl. ........................ 370/465; 380/565; 370/537
(58) Field of Classification Search ................ 370/487, 370/486, 465, 537; 725/32
See application file for complete search history.

(56) References Cited

U.S. PATENT DOCUMENTS

| | | | | |
|---|---|---|---|---|
| 5,917,830 | A * | 6/1999 | Chen et al. ................. | 370/487 |
| 6,029,045 | A * | 2/2000 | Picco et al. .................... | 725/34 |
| 6,175,573 | B1 * | 1/2001 | Togo et al. ................. | 370/474 |
| 6,606,112 | B1 * | 8/2003 | Falco ...................... | 348/14.12 |
| 6,611,624 | B1 * | 8/2003 | Zhang et al. ............... | 382/232 |
| 6,771,657 | B1 * | 8/2004 | Elstermann ................. | 370/465 |
| 6,831,949 | B1 * | 12/2004 | Brightwell et al. .... | 375/240.12 |
| 6,912,251 | B1 * | 6/2005 | Ward et al. ................. | 375/240 |

FOREIGN PATENT DOCUMENTS

| | | |
|---|---|---|
| DE | 196 40 338 A1 | 3/1998 |
| DE | 197 54 983 A1 | 6/1999 |
| EP | 0 148 733 A1 | 7/1985 |
| EP | 0 838 957 A2 | 4/1998 |
| WO | WO-99/66719 A1 | 12/1999 |

OTHER PUBLICATIONS

Weiss, S. M., "Switching Facilities in MPEG-2: Necessary but not Sufficient", SMPTE Journal, Dec. 1995, vol. 104, No. 12, pp. 788-802.
Motorola, "Integrated Datacasting Solutions for Digital Television", Jun. 1999, pp. 1-13.

* cited by examiner

*Primary Examiner*—Doris H. To
*Assistant Examiner*—Steven Blount
(74) *Attorney, Agent, or Firm*—Lerner, David, Littenberg, Krumholz & Mentlik, LLP

(57) ABSTRACT

A multiplexing apparatus for multiplexing a first stream and a second stream for output includes a first input unit supplied with a first material; a second input unit supplied with a second material; a first selecting unit for selecting one of the first material and the second material as material of the first stream; a second selecting unit for selecting the other of the first material and the second material as material of the second stream; a control unit for controlling the first selecting unit and the second selecting unit so as to select the second material in place of the first material as the material of the first stream and so as to select the first material as the material of the second stream during a predetermined period of time; and a multiplexing unit for multiplexing the first stream and the second stream.

18 Claims, 7 Drawing Sheets

US 7,120,163 B2

MULTIPLEXING APPARATUS AND METHOD, IMAGE OUTPUT APPARATUS AND METHOD, AND RECORDING MEDIUM

CROSS-REFERENCE TO RELATED APPLICATIONS

The present application claims priority from Japanese Application No. P2000-248493 filed on Aug. 18, 2000, the disclosure of which is hereby incorporated by reference herein.

BACKGROUND OF THE INVENTION

The present invention relates to an apparatus and a method for multiplexing, an apparatus and a method for image output, and a recording medium, and particularly to an apparatus and a method for multiplexing, an apparatus and a method for image output, and a recording medium that enable a viewer to view a main part of a television broadcast program without an interruption by a commercial and the like.

Since television broadcasting has become widespread, a viewer can enjoy sports programs and other broadcasts at home. However, in the case of commercial television broadcasts, a commercial break for promoting a product or service of an advertiser is inserted into a main part of the program at predetermined times. As a result, the viewer cannot enjoy the main part of the program, for example a sporting event, during the period the commercial break is being broadcast.

Similarly, for example, if an important play, such as a goal in a soccer match, is broadcast on replay during the main part of the program, the viewer cannot enjoy seeing the movement of players during the commercial break.

SUMMARY OF THE INVENTION

The present invention has been made in view of the above, and it is accordingly an object of the present invention to enable the viewer to view the main part of the program continuously.

A multiplexing apparatus according to the present invention includes a first input unit operable to receive a first material; a second input unit operable to receive a second material; a first selecting unit operable to select one of the first material and the second material as material of a first stream; a second selecting unit operable to select another of the first material and the second material as material of a second stream; a control unit operable to control the first selecting unit so as to select the another material in place of the one material as the material of the first stream, and operable to control the second selecting unit so as to select the one material as the material of the second stream during a predetermined period of time; and a multiplexing unit operable to multiplex the first stream and the second stream.

The multiplexing apparatus may further include a rate control unit operable to control a bit rate of the second stream to a value within a range that does not limit a bit rate of the first stream.

The second material may be a commercial.

The second selecting unit may select a third material as the material of the second stream before selecting the one material, the third material being displayed simultaneously with the one material of the second stream.

A multiplexing method according to the present invention includes inputting a first material and a second material; selecting one of the first and second materials as material of a first stream and selecting another of the first and second materials as material of a second stream; selecting the another material in place of the one material as the material of the first stream and selecting the one material as the material of the second stream during a predetermined period of time; and multiplexing the first stream and the second stream.

A recording medium according to the present invention is recorded with a program for multiplexing a first stream and a second stream for output. The program includes inputting a first material and a second material; selecting one of the first and second materials as material of a first stream and selecting another of the first and second materials as material of a second stream; selecting the another material in place of the one material as the material of the first stream and selecting the one material as the material of the second stream during a predetermined period of time; and multiplexing the first stream and the second stream.

An image output apparatus according to the present invention includes a selecting unit operable to select one stream from among a first stream and a second stream; a control unit operable to control the selecting unit so as to select another stream from among the first stream and the second stream in place of the one stream during a predetermined period of time; and an output unit operable to output during one time the one stream selected by the selecting unit and during another time the another stream selected by the selecting unit.

The control unit may control display such that an image included in the one stream is displayed as an image of a specified area, and an image included in the another stream is displayed as an image of an area smaller than the specified area.

An image output method according to the present invention includes selecting one stream from among a first stream and a second stream; controlling the selecting step so as to select another stream from among the first stream and the second stream in place of the one stream during a predetermined period of time; and outputting the one stream during one time, and outputting the another stream during another time.

A recording medium according to the present invention is recorded with a program for controlling an image output. The program includes selecting one stream from among a first stream and a second stream; controlling the selecting step so as to select another stream from among the first stream and the second stream in place of the one stream during a predetermined period of time; and outputting the one stream during one time, and outputting the another stream during another time.

The apparatus and the method for multiplexing and the program on a recording medium according to the present invention select the another material in place of the one material as the material of the first stream and select the one material as the material of the second stream during a predetermined period of time.

The apparatus and the method for image output and the program on a recording medium according to the present invention select the another stream in place of the one stream during a predetermined period of time, and display the material included in the another stream as an image smaller than an image of the material included in the one stream.

DETAILED DESCRIPTION

Figure 1:
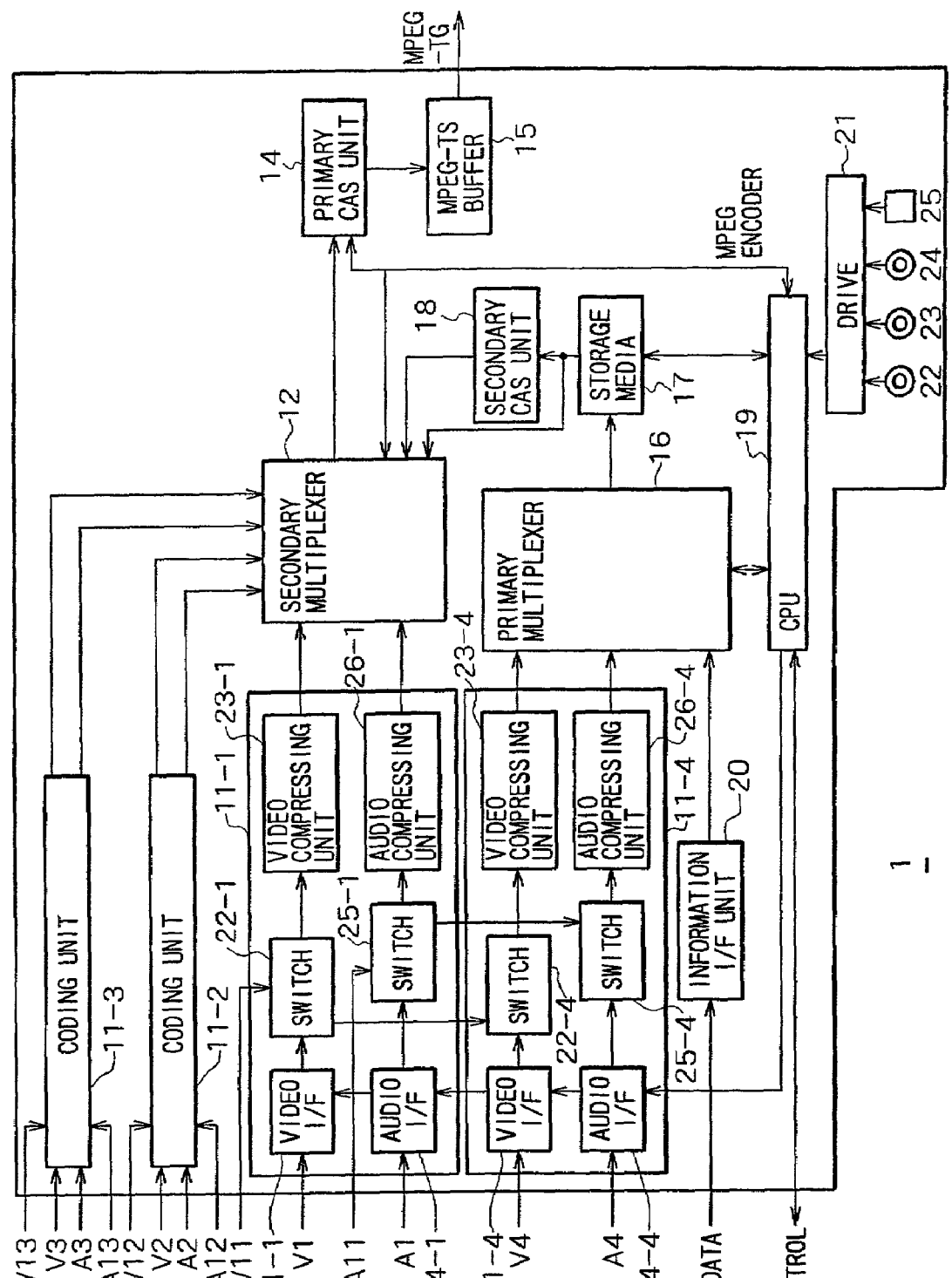
FIG. 1 is a block diagram showing a configuration of a multiplexing apparatus to which the present invention is applied.

FIG. 1 shows a configuration of a multiplexing apparatus to which the present invention is applied. The multiplexing apparatus 1 has four coding units 11-1 to 11-4. The coding unit 11-1 encodes a video signal V1 and an audio signal A1, which comprise a single stream (one program channel). In order for the coding unit 11-1 to encode the video signal V1, the video signal V1 is input from a video interface (I/F) 21-1 to a video compressing unit 23-1 via a switch 22-1. The video compressing unit 23-1 encodes (compresses) the video signal input via the switch 22-1 by an MPEG (Motion Picture Expert Group) 2 method, and then outputs the video signal to a secondary multiplexer 12.

An audio interface 24-1 takes in the audio signal A1 and then outputs the audio signal A1 to an audio compressing unit 26-1 via a switch 25-1. The audio compressing unit 26-1 encodes (compresses) the audio signal input thereto, and then outputs the audio signal to the secondary multiplexer 12.

Though not shown, the coding units 11-2 and 11-3 are formed in the same manner as the coding unit 11-1. The coding units 11-2 and 11-3 supply the secondary multiplexer 12 with coded data of a second stream comprising a video signal V2 and an audio signal A2 and coded data of a third stream comprising a video signal V3 and an audio signal A3, respectively.

Similarly to the coding unit 11-1, the coding unit 11-4 has a video interface 21-4, a switch 22-4, and a video compressing unit 23-4 for processing a video signal V4 and an audio interface 24-4, a switch 25-4, and an audio compressing unit 26-4 for processing an audio signal A4.

The coding unit 11-4 encodes a video signal and an audio signal to be inserted into empty space in a transmission band. As the video signal to be inserted, the video signal V1 from the switch 22-1 of the coding unit 11-1 as well as the video signal V4 are supplied to the switch 22-4. As the audio signal, the audio signal A1 from the switch 25-1 of the coding unit 11-1 as well as the audio signal A4 are supplied to the switch 25-4. Though not shown, the video signals V2 and V3 or the audio signals A2 and A3 are also supplied from the coding units 11-2 and 11-3 to the switch 22-4 or the switch 25-4, respectively.

The switch 22-4 selects either the video signal V4 supplied from the video signal interface 21-4, the video signal V1 supplied from the coding unit 11-1, the video signal V2 supplied from the coding unit 11-2, or the video signal V3 supplied from the coding unit 11-3. The selected video signal is supplied to the video compressing unit 23-4. The video compressing unit 23-4 compresses the video signal supplied from the switch 22-4. Similarly, the switch 25-4 selects either the audio signal A4 supplied from the audio interface 24-4, the audio signal A1 supplied from the coding unit 11-1, the audio signal A2 supplied from the coding unit 11-2, or the audio signal A3 supplied from the coding unit 11-3. The selected audio signal is supplied to the audio compressing unit 26-4. The audio compressing unit 26-4 compresses the audio signal supplied from the switch 25-4. The video signal compressed by the video compressing unit 23-4 and the audio signal compressed by the audio compressing unit 26-4 are supplied to a primary multiplexer 16.

The primary multiplexer 16 is also supplied with data for broadcast taken in by an information interface 20.

The secondary multiplexer 12 multiplexes the three streams supplied from the coding units 11-1 to 11-3, and then outputs the result to a primary CAS unit 14. The primary CAS unit 14 enciphers (scrambles) the stream supplied from the secondary multiplexer 12 using a predetermined key (a key corresponding to a key stored in an IC card 91 of a viewer (FIG. 2)), and then supplies the result to an MPEG-TS buffer 15. The MPEG-TS buffer 15 outputs the data input thereto as an MPEG transport stream to a transmitter not shown in the figure. The transmitter modulates the multiplexed stream, and then broadcasts the multiplexed stream to each household via a satellite or the like not shown in the figure.

The primary multiplexer 16 multiplexes a fourth stream input from the coding unit 11-4 and the data stream input from the information interface 20. The result is output to storage media 17 formed by a hard disk, for example, to be temporarily stored therein. The secondary multiplexer 12 multiplexes the three streams supplied from the coding units 11-1 to 11-3 at specified bit rates based on the complexity or the like of the video signals and the audio signals of the streams. A CPU (Central Processing Unit) 19 monitors the bit rate allocated to each of the streams in the secondary multiplexer 12, and then calculates a remaining bit rate of the transmission band being used. On the basis of the remaining bit rate, the CPU 19 controls the bit rate of the fourth stream output from the storage media 17, and then supplies the stream to the secondary multiplexer 12. A secondary CAS unit 18 may encipher (scramble) the fourth stream output from the storage media 17 and then supply the stream to the secondary multiplexer 12, as required.

Thus, the secondary multiplexer 12 multiplexes a total of four streams: the three streams supplied from the coding units 11-1 to 11-3 and the stream supplied from the secondary CAS unit 18.

The CPU 19 further controls operation of the parts mentioned above on the basis of control data supplied from another apparatus not shown in the figure.

When a magnetic disk 22, an optical disk 23, a magneto-optical disk 24, a semiconductor memory 25 or the like is inserted into a drive 21, the drive 21 loads a program recorded on the magnetic disk 22, the optical disk 23, the magneto-optical disk 24, the semiconductor memory 25 or the like so that the CPU 19 executes the program.

Figure 2:
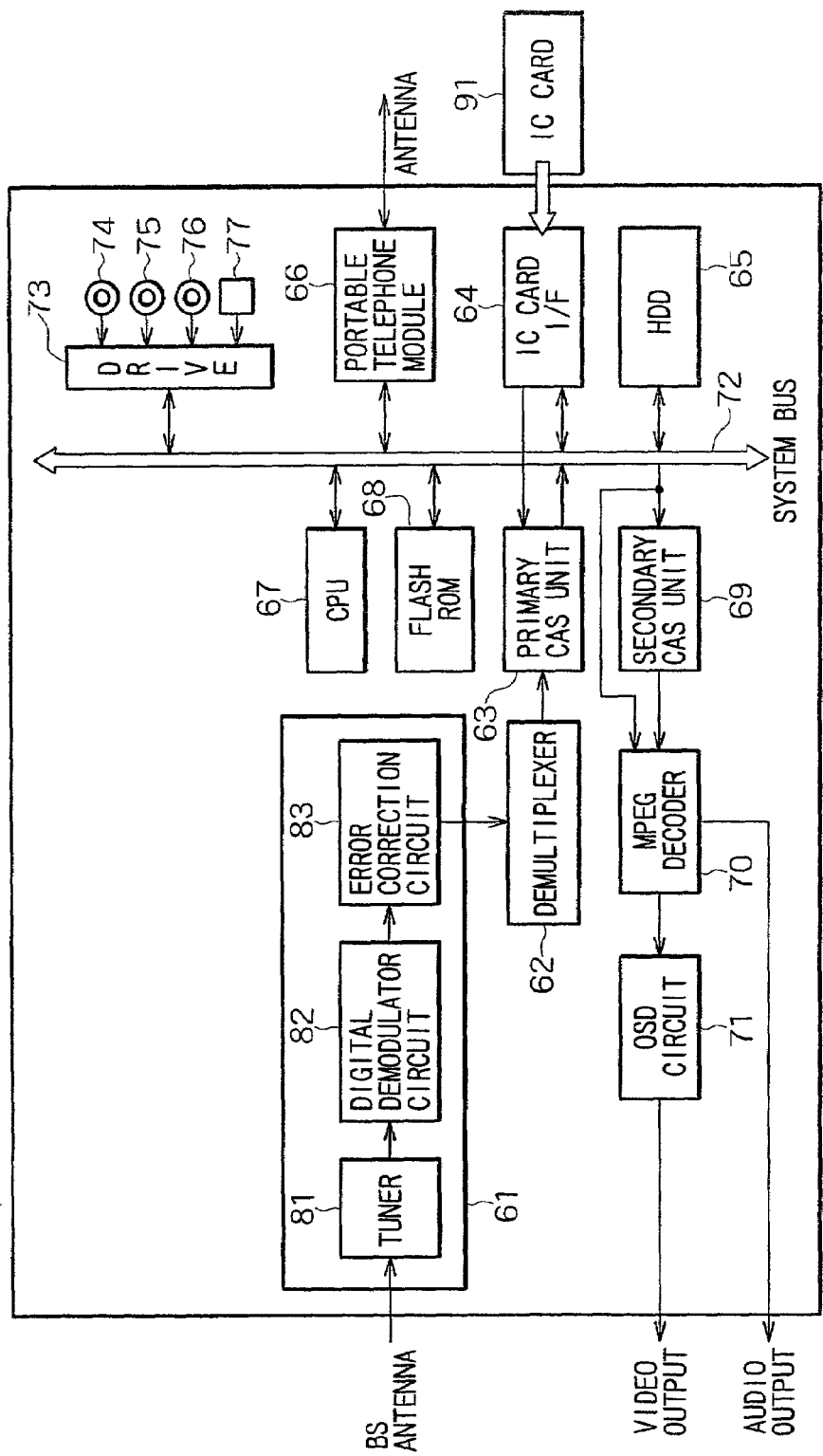
FIG. 2 is a block diagram showing a configuration of a hard disk recorder to which the present invention is applied.

A television signal multiplexed and broadcast by the multiplexing apparatus 1 is received and reproduced in each household by, for example, a hard disk recorder 51 as shown in FIG. 2.

The hard disk recorder 51 in the example of FIG. 2 receives the television broadcast signal by means of an external BS antenna, and then inputs an intermediate-frequency signal resulting from conversion by the BS antenna to a tuner 81 of a front end unit 61. The tuner 81 converts the intermediate-frequency signal input thereto into a baseband signal, and then outputs the baseband signal to a digital demodulator circuit 82. The digital demodulator circuit 82 demodulates the signal input thereto, and then outputs the result to an error correction circuit 83. The error correction circuit 83 corrects an error of the demodulated data input from the digital demodulator circuit 82, and then outputs the resulting data to a demultiplexer 62.

The demultiplexer 62 selects one stream (program channel) from one transmission channel input thereto (including the four streams, that is, four program channels in this case) according to an instruction from the user, and then outputs the stream to a primary CAS unit 63.

The primary CAS unit 63 deciphers (descrambles) the stream supplied from the demultiplexer 62 on the basis of a key stored in an IC card 91 inserted into an IC card interface 64. When an instruction for recording has been issued by the user, a CPU 67 supplies the deciphered stream to a hard disk drive 65 for recording via a system bus 72. When an instruction for real-time reproduction has been issued, the output of the primary CAS unit 63 is supplied to a secondary CAS unit 69. The secondary CAS unit 69 deciphers (descrambles) the stream input thereto on the basis of a key that is prestored or obtained by accessing a specified server via a portable module 66, and then outputs the result to an MPEG decoder 70.

The MPEG decoder 70 decodes the stream input thereto by an MPEG method. The MPEG decoder 70 then supplies a resulting video signal to an OSD (On Screen Display) circuit 71 to multiplex an image based on specified OSD data. The result is thereafter output for display to a display such as a CRT or an LCD not shown in the figure. An audio signal output from the MPEG decoder 70 is supplied to a speaker or the like not shown in the figure.

The CPU 67 controls operation of the above parts in response to an instruction from the user. When a magnetic disk 74, an optical disk 75, a magneto-optical disk 76, a semiconductor memory 77 or the like is inserted into a drive 73, the drive 73 downloads a program stored on the magnetic disk 74, the optical disk 75, the magneto-optical disk 76, the semiconductor memory 77 or the like to the hard disk drive 65 as required. Various data and programs are stored in a flash ROM 68 as required.

Figure 3:
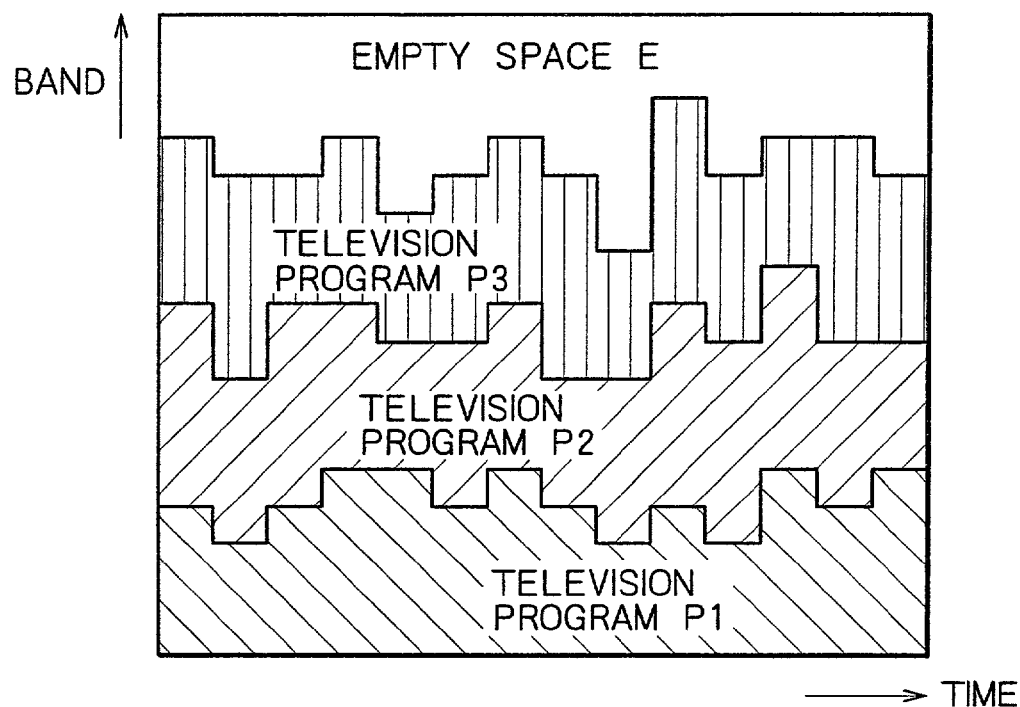
FIG. 3 is a diagram of assistance in explaining multiplexing principles of the multiplexing apparatus in FIG. 1.

The secondary multiplexer 12 in FIG. 1 multiplexes the streams in a manner as shown in FIG. 3, for example. In FIG. 3, the ordinate axis denotes a band of one transmission channel, and the abscissa axis denotes time. As shown in FIG. 3, a television program P1 forming the first stream, a television program P2 forming the second stream, and a television program P3 forming the third stream are coded at variable bit rates (VBR) by the coding units 11-1 to 11-3, respectively. The streams are multiplexed into one transmission channel having a predetermined bandwidth (for example 22 Mbps) by the secondary multiplexer 12. As a result, an empty space E is formed in the transmission channel. The fourth stream coded by the coding unit 11-4 is multiplexed into the empty space E.

The capacity of the empty space E varies according to variations in the volume of the first to third streams. The empty space E is inherently not formed intentionally but created only as a consequence. This means that limitations on the bit rates of the first to third streams for securing a given space as the empty space E will not be imposed. On the other hand, the bit rate of the fourth stream to be inserted into the empty space E is controlled so as not to limit the bit rates of the first to third streams.

Figure 4:
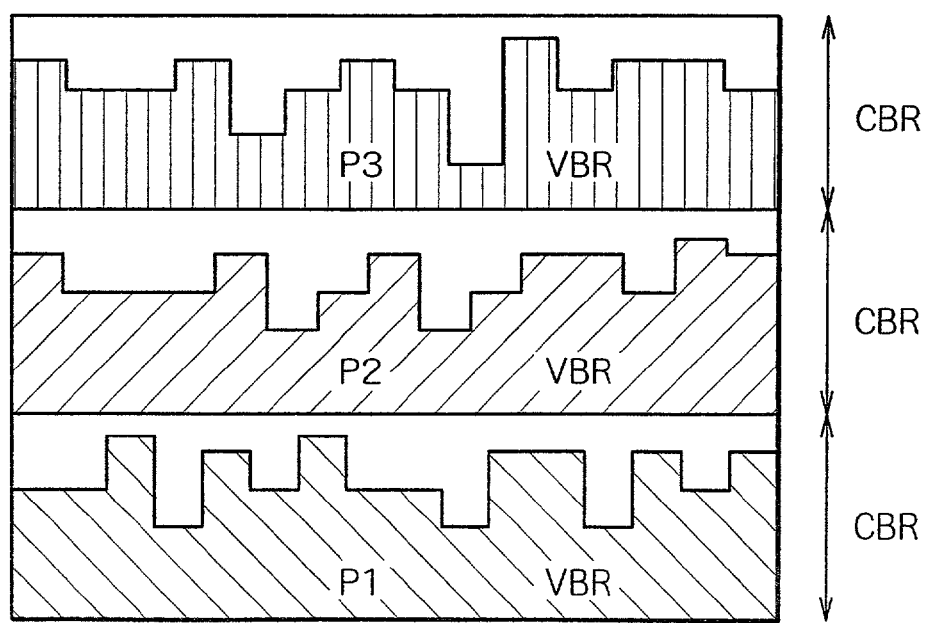
FIG. 4 shows an example of multiplexing different from that of FIG. 2.

To illustrate for comparison, the secondary multiplexer 12 does not multiplex the streams in a manner as shown in FIG. 4. Specifically, in the example of FIG. 4, each of the first to third streams formed by the television programs P1 to P3 is coded within a range of a preset maximum bit rate. If the streams are multiplexed on the basis of this principle, each of the streams requires an empty space to spare. Therefore, it is practically difficult to transmit the fourth stream by using one empty space obtained by combining the empty spaces of the three streams. Thus, it may be said that in this case, one transmission band is divided into three constant bit rates (CBR), and the streams are coded within their respective bands at variable bit rates.

Figure 5:
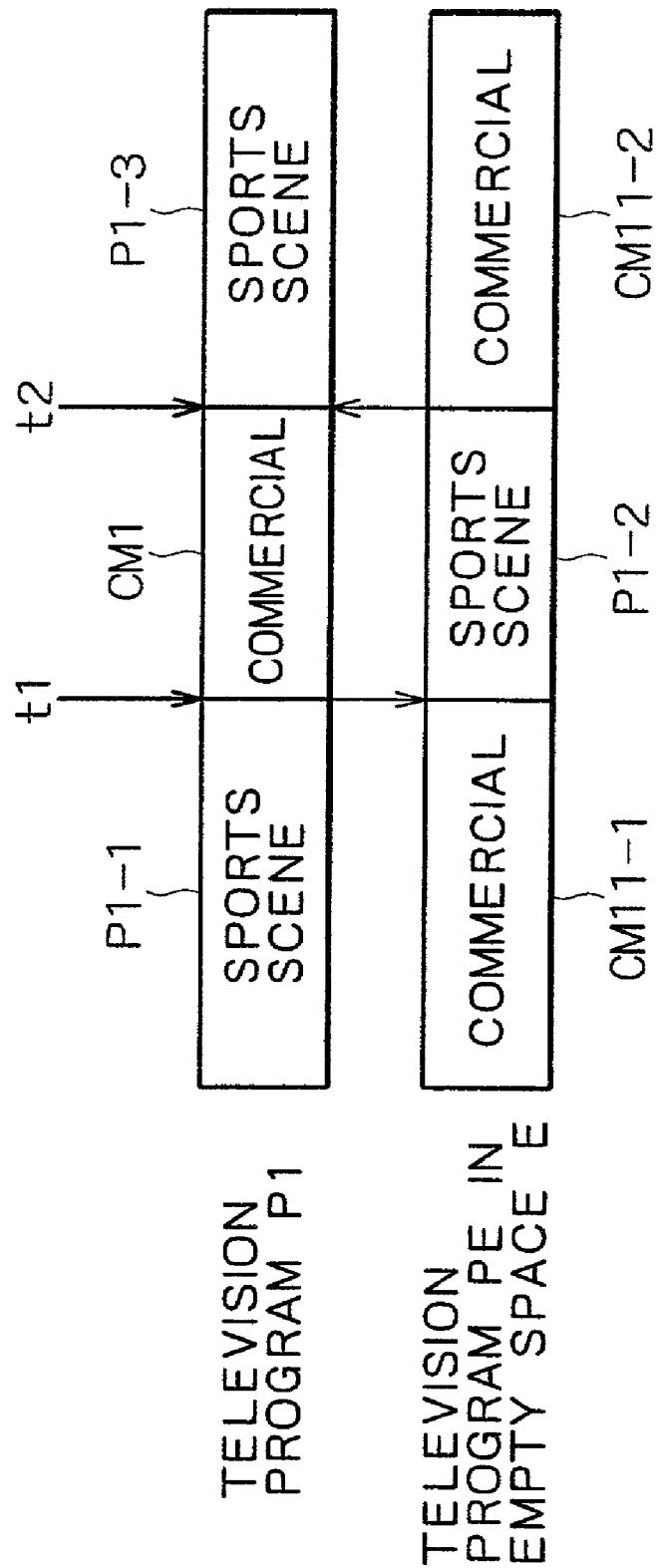
FIG. 5 illustrates a relation between two streams.

FIG. 5 schematically shows the relationship between the fourth stream (auxiliary stream) to be inserted into the empty space E and the first to third streams as the main streams.

As shown in FIG. 5, in this example, the television program P1 forming the first stream is, for example, a program of a soccer match being broadcast live, and therefore the television program P1 is basically formed by continuous sports scenes. However, a commercial is inserted during a specified time (in this case during a period from a time t1 to a time t2). As a result, the first stream has a sports scene P1-1 broadcast until the time t1, a commercial CM1 broadcast during the period from the time t1 to the time t2, and again a sports scene P1-3 broadcast after the time t2. Thus, a viewer of the first stream is not able to view a continuous sports scene during the period from the time t1 to the time t2.

According to the present invention, a sports scene P1-2 whose starting point is continuous with the sports scene P1-1 and whose ending point is continuous with the sports scene P1-3 is broadcast as a television program PE of the fourth stream in the empty space E during the period from the time t1 to the time t2. During a period until the time t1, a commercial CM11-1, which is displayed simultaneously with the sports scene P1-2 on the same screen, is inserted into the fourth stream. During a time period after the time t2, a commercial CM11-2 is disposed in the fourth stream. When a sports scene P1-4 (not shown in the figure) succeeding the sports scene P1-3 is disposed in the fourth stream, the commercial CM11-2 is displayed simultaneously with the sports scene P1-4.

Figure 6:
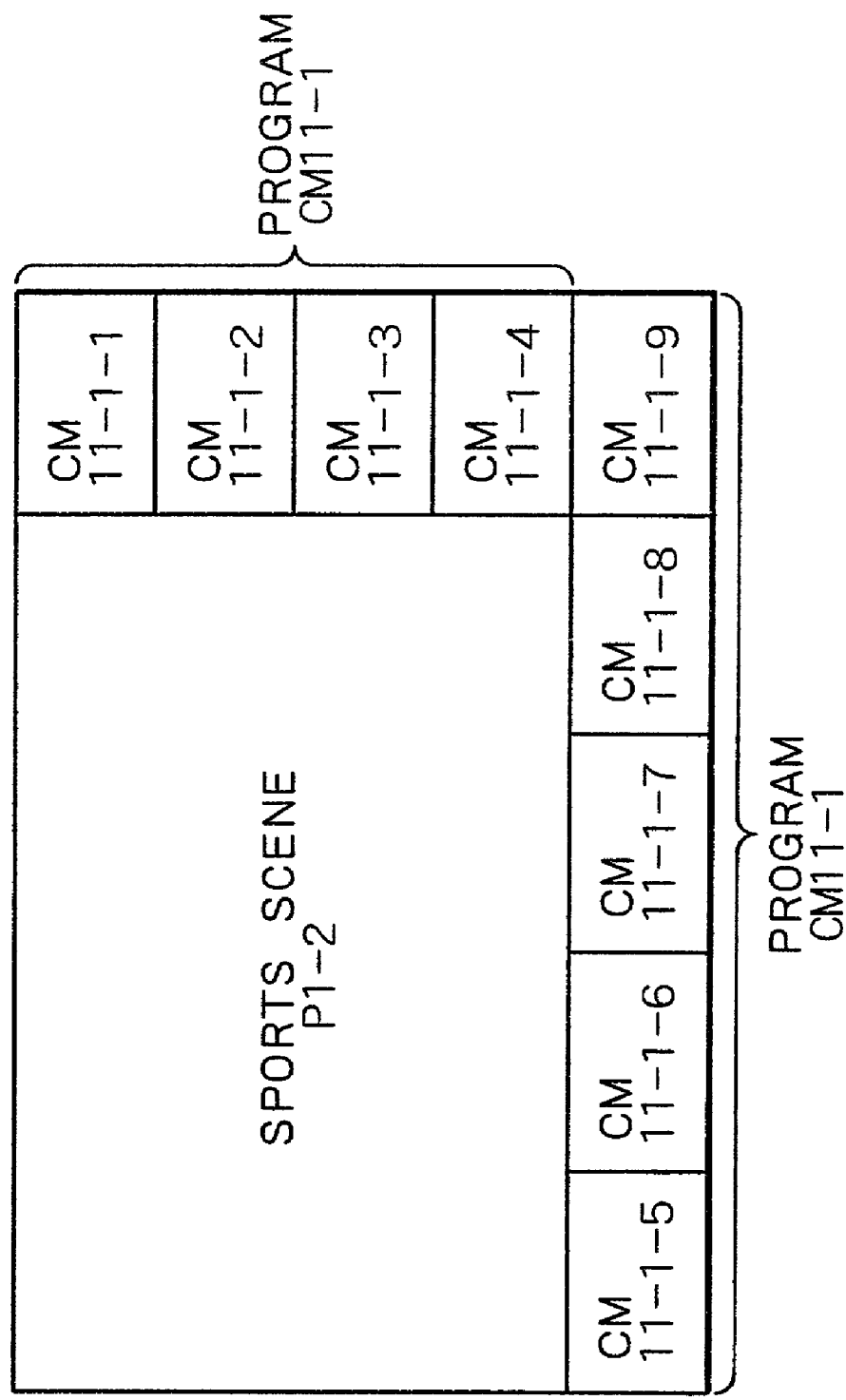
FIG. 6 shows an example of a display of the two streams shown in FIG. 5.

FIG. 6 shows an example of such display. In this example, an image of the sports scene P1-2 included in the fourth stream is displayed as an image of a slightly smaller area than that of a normal image. Commercial images CM11-1-1 to CM11-1-9 comprising the commercial CM11-1 broadcast temporally before the sports scene P1-2 are displayed as images smaller than the image of the sports scene P1-2 on the right side and the lower side of the image of the sports scene P1-2.

The multiplexing processing of the multiplexing apparatus 1 in FIG. 1 will next be described. The coding unit 11-1 takes in the video signal V1 by means of the video interface 21-1, and then supplies the video signal V1 to the video compressing unit 23-1 via the switch 22-1. The video compressing unit 23-1 encodes (compresses) the video signal V1. Similarly, the audio signal A1 taken in by the audio interface 24-1 is supplied to the audio compressing unit 26-1 via the switch 25-1. The audio compressing unit 26-1 compresses the audio signal. Also, the coding unit 11-2 compresses the video signal V2 and the audio signal A2, and the coding unit 11-3 compresses the video signal V3 and the audio signal A3. The first to third streams (television programs P1 to P3) output by the coding units 11-1 to 11-3 are supplied to the secondary multiplexer 12 to be multiplexed into one transmission channel, as shown in FIG. 3.

On the other hand, the video interface 21-4 and the audio interface 24-4 of the coding unit 11-4 take in the video signal V4 and the audio signal A4, respectively, which form the fourth stream, and then supply the video signal V4 and the audio signal A4 to the video compressing unit 23-4 and the audio compressing unit 26-4 via the switch 22-4 and the switch 25-4, respectively. The video compressing unit 23-4 compresses the video signal input thereto. The audio compressing unit 26-4 similarly compresses the audio signal input thereto. The primary multiplexer 16 multiplexes the video data input from the video compressing unit 23-4, the audio data input from the audio compressing unit 26-4, and the data for broadcast input via the information interface 20 under control of the CPU 19. The result is supplied to the storage media 17 to be stored therein.

The CPU 19 effects control under control of an external apparatus so that the fourth stream is inserted into the empty space E as required.

Thus, the CPU 19 monitors the bit rates of the first to third streams output by the secondary multiplexer 12, and thereby calculates the capacity of the empty space E. Then, the CPU 19 corrects the bit rate of the fourth stream so that the fourth stream may be inserted into the empty space E.

The data of the fourth stream having the adjusted bit rate is read from the storage media 17, enciphered (scrambled) by the secondary CAS unit 18 as required, and then supplied to the secondary multiplexer 12. The secondary multiplexer 12 multiplexes the first to third streams supplied from the coding units 11-1 to 11-3 and the fourth stream supplied from the secondary CAS unit 18, and then outputs the multiplexed stream to the primary CAS unit 14.

The primary CAS unit 14 enciphers (scrambles) the whole of the multiplexed stream supplied from the secondary multiplexer 12, and then supplies the resulting multiplexed stream to the MPEG-TS buffer 15. The MPEG-TS buffer 15 converts the multiplexed stream supplied from the primary CAS unit 14 into an MPEG transport stream format, and then outputs the result to a transmission apparatus not shown in the figure.

When the commercial CM1 is inserted into the first stream formed by the television program P1 at the time t1 after the sports scene P1-1, and the sports scene P1-3 is reinserted into the first stream at the time t2 as shown in FIG. 5, for example, the switch 22-1 of the coding unit 11-1 switches data of the sports scene P1-1, which has been input as the video signal V1, to data of the commercial CM1 input as a video signal V11 at the data input time t1. Then, at the time t2, the switch 22-1 switches from the commercial CM1, which has been selected as the video signal V11, to the sports scene P1-3 supplied as the video signal V1 via the video interface 21-1. Thus, the first stream is switched from the sports scene P1-1 to the commercial CM1 at the time t1, and is further switched from the commercial CM1 to the sports scene P1-3 at the time t2. Switching between the audio signals is also performed in synchronization with the video signals.

On the other hand, the switch 22-4 in the coding unit 11-4 selects the commercial CM11-1 supplied as the video signal V4 until the time t1, and then supplies the commercial CM11-1 to the video compressing unit 23-4. At the time t1, the switch 22-4 selects the sports scene P1-2 supplied as the video signal V1 from the switch 22-1, and then supplies the sports scene P1-2 to the video compressing unit 23-4. At the time t2, the switch 22-4 selects the commercial CM11-2 supplied as the video signal V4 from the video interface 21-4 in place of the sports scene P1-2 that has been supplied from the switch 22-1, and then outputs the commercial CM11-2 to the video compressing unit 23-4.

Similarly to the switch 22-4, at the time t1, the switch 25-4 selects the audio signal A1 corresponding to the sports scene P1-2 supplied from the switch 25-1 in place of the audio signal A4, and then supplies the audio signal A1 to the audio compressing unit 26-4. At the time t2, the switch 25-4 selects the audio signal A4 supplied via the audio interface 24-4 instead of selecting the audio signal A1 that has been supplied from the switch 25-1, and then supplies the audio signal A4 to the audio compressing unit 26-4.

Thus, the television program PE of the empty space E is switched from the commercial CM11-1 to the sports scene P1-2 at the time t1, and is switched from the sports scene P1-2 to the commercial CM11-2 at the time t2.

Since the commercial CM11-1 and the commercial CM11-2 do not necessarily need to be displayed in real time, the lowering of their transfer bit rates does not present much of a practical problem when the commercials are temporarily recorded and then reproduced on the hard disk recorder 51 side. On the other hand, since the sports scene P1-2 is continuous with the sports scene P1-1 and the sports scene P1-3, the sports scene P1-2 needs to be displayed in real time. When the capacity of the empty space E is not sufficient to transmit data of a normal-size screen (full screen), reduction of image size (image frame) can lower the volume of the sports scene P1-2 (an image of a full screen of M×N pixels is converted into an image of m×n pixels (m<M, n<N)). Thus, although the image becomes smaller, its real-time display is ensured.

The hard disk recorder 51 can accommodate delay on the time axis by temporarily recording the received data on the hard disk drive 65 and then reproducing the data. A receiving apparatus without such a built-in recording unit cannot make such adjustment on the time axis; therefore, the image frame is made smaller, and thereby its real-time display can be ensured.

The operation described above is illustrated in the flowchart of FIG. 7.

Specifically, at a first step S1, the CPU 19 controls the coding unit 11-4 to multiplex the data of the commercial CM11-1 as data of the empty space E. At a step S2, the CPU 19 determines whether the entire stream of the commercial CM11-1 has been transmitted (multiplexed). When the entire stream has not been transmitted, the process returns to the step S1 to repeat the process at the step S1.

When the CPU 19 determines at the step S2 that the entire stream of the commercial CM11-1 has been transmitted, the process proceeds to a step S3, where the CPU 19 transmits stream schedule data indicating stream switching at the time t1 as part of the data for data broadcast.

At the next step S4, the CPU 19 waits until the time for transmitting (multiplexing) the commercial CM1 arrives. When the transmission time has arrived, the process proceeds to a step S5, where the CPU 19 calculates the capacity of the empty space E in the transmission channel on the basis of the spaces used by the first to third streams in the secondary multiplexer 12.

At a step S6, the CPU 19 determines whether the capacity of the empty space E calculated at the step S5 provides a sufficient band to transmit the sports scene P1-2. When the band is not sufficient (when the band is lacking), the process proceeds to a step S7, where the CPU 19 performs processing to reduce the screen size of the sports scene P1-2 stored in the storage media 17. More specifically, the CPU 19 converts an image of a full screen of M×N pixels into an image of m×n pixels. At a step S8, the CPU 19 compresses the image data stored in the storage media 17 as required. At a step S9, the CPU 19 multiplexes data specifying the screen size set at the step S7 and data specifying the arrangement of the commercials CM11-1-1 to 11-1-9 around the periphery of the image (sports scene P1-2) of the reduced screen size as shown in FIG. 6.

When the CPU 19 determines at the step S6 that the capacity of the empty space E is sufficient, the processes at the steps S7 to S9 are skipped. Specifically, in this case, the commercials CM11-1-1 to 11-1-9 shown in FIG. 6 are not displayed, and the image of the sports scene P1-2 is displayed in full screen size.

At the next step S10, the CPU 19 outputs data instructing a receiving apparatus (the hard disk recorder 51 in this case) receiving and reproducing the stream of the television program P1 to switch to the stream of the empty space E at the time t1.

At the next step S11, the CPU 19 waits until the time for ending the commercial CM1 (time t2) arrives. When that time has arrived, the process proceeds to a step S12, where the CPU 19 outputs data for switching the screen size back to the original full screen size. Also, at a step S13, the CPU 19 outputs an instruction to switch from the stream of the empty space E to the stream of the television program P1.

Operation of the hard disk recorder 51 in FIG. 2 will next be described. The tuner 81 converts the intermediate-frequency signal supplied from the BS antenna into a baseband signal, and then supplies the baseband signal to the digital demodulator circuit 82. The digital demodulator circuit 82 demodulates the baseband signal, and then supplies the result to the error correction circuit 83. The error correction circuit 83 corrects an error of the signal input thereto, and then outputs the result to the demultiplexer 62.

The demultiplexer 62 is controlled by the CPU 67 according to an instruction from the user to select the stream of a program channel included in the multiplexed streams of the transmission channel input thereto, and then outputs the stream to the primary CAS unit 63. When the stream input to the primary CAS unit 63 is enciphered, the primary CAS unit 63 deciphers (descrambles) the stream using a key recorded on the IC card 91. When an instruction for recording the deciphered stream has been issued by the user, the stream is supplied to the hard disk drive 65 for recording under control of the CPU 67.

When an instruction for reproducing the stream has been issued by the user, the CPU 67 controls the hard disk drive 65 to reproduce the stream recorded on the hard disk drive 65. The stream is input to the secondary CAS unit 69, and when the stream is enciphered, the secondary CAS unit 69 deciphers the stream using a built-in key. When there is no built-in key, the CPU 67 controls the portable telephone module 66 to access a specified center via a telephone line. A key obtained from the specified center via the telephone line is supplied via the system bus 72 to the secondary CAS unit 69 to be stored therein.

When an instruction for real-time reproduction has been issued by the user, the stream output from the primary CAS unit 63 is directly supplied via the system bus 72 to the secondary CAS unit 69 to be deciphered.

The stream deciphered by the secondary CAS unit 69 is supplied to the MPEG decoder 70 to be decoded. A video signal resulting from the decoding of the stream is supplied to the OSD circuit 71. The OSD circuit 71 superimposes an OSD signal upon the video signal as required. The result is thereafter output to a display for display. An audio signal output from the MPEG decoder 70 is supplied to a speaker.

Figure 8:
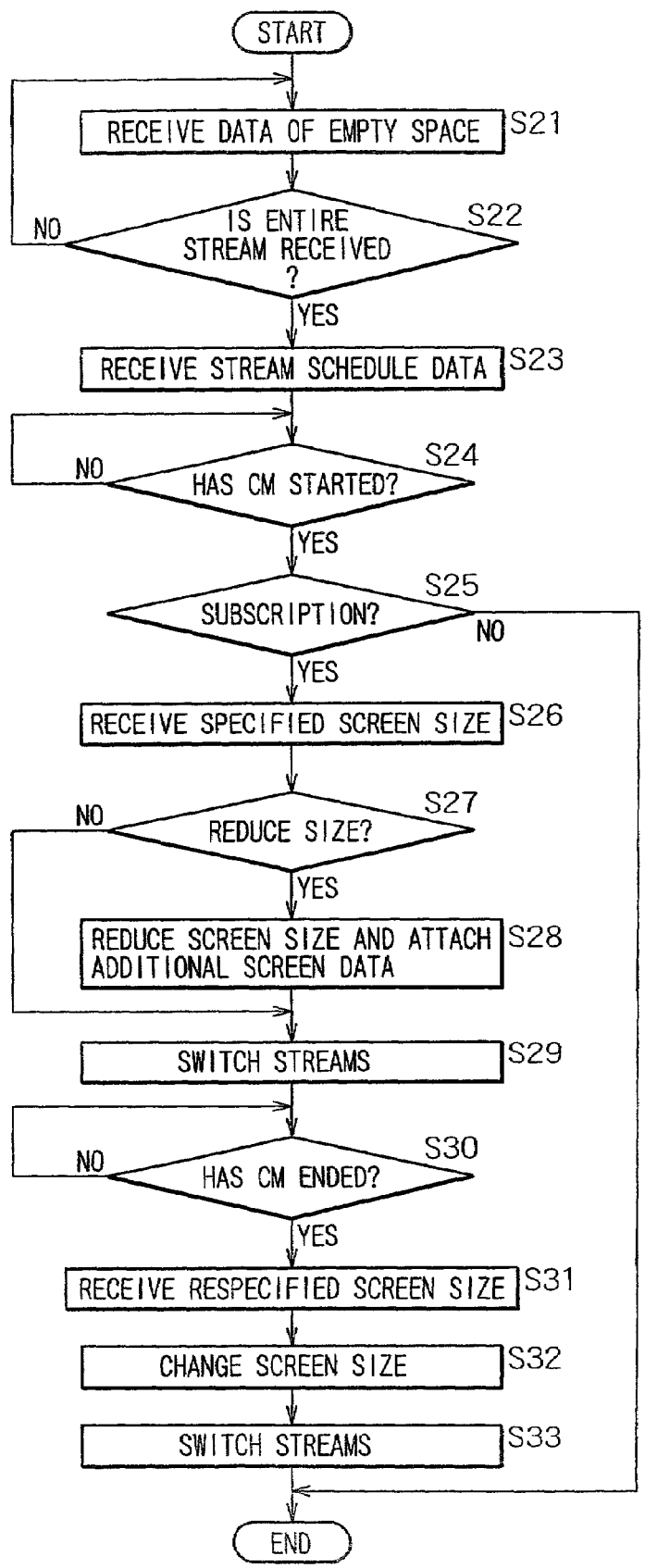
FIG. 8 is a flowchart of assistance in explaining the operation of the hard disk recorder in FIG. 4.

The above process will be described in further detail with reference to the flowchart of FIG. 8.

At a first step S21, the CPU 67 receives the data of the empty space E, and then supplies the data to the hard disk drive 65 for recording. Thus, the commercial CM11-1 in FIG. 5 is recorded on the hard disk drive 65. At a step S22, the CPU 67 determines whether the entire stream of the commercial CM11-1 has been received. When the entire stream has not been received yet, the process returns to the step S21 to repeat the process at the step S21.

Figure 7:
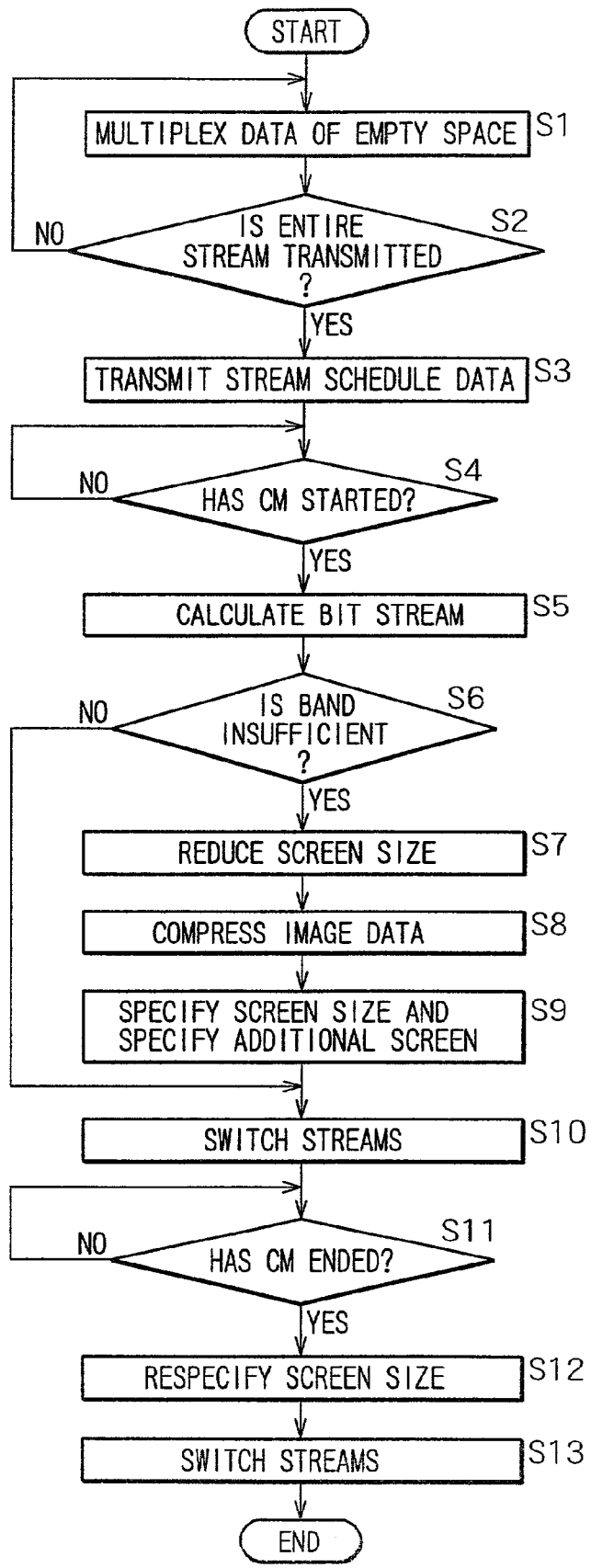
FIG. 7 is a flowchart of assistance in explaining the operation of the multiplexing apparatus in FIG. 1.

When the CPU 67 determines at the step S22 that the entire data of the commercial CM11-1 has been received, the process proceeds to a step S23, where the CPU 67 receives the stream schedule data transmitted at the step S3 in FIG. 7. According to the stream schedule data, the CPU 67 waits until the time for starting demodulation of the commercial CM1 (time t1) arrives at a step S24. When the time has arrived, the process proceeds to a step S25. When the hard disk recorder 51 receives the commercial CM1 while receiving the television program P1, the CPU 67 determines whether a subscription to receive and display the sports scene P1-2 of the empty space E in place of the commercial CM1 has been taken out in advance or not. When the subscription has been taken out, its information is prestored in the flash ROM 68. Thus, the CPU 67 performs the determination process at the step S25 on the basis of contents stored in the flash ROM 68.

When it is determined at the step S25 that a subscription to skip the commercial and view the continuous sports scene has been taken out, the process proceeds to a step S26, where the CPU 67 receives the data specifying the screen size transmitted at the step S9 in FIG. 7. On the basis of the data, at a step S27, the CPU 67 determines whether a reduction of the screen size has been specified. When a reduction of the screen size has been specified, the process proceeds to a step S28, where the CPU 67 reduces the screen size, and also controls the OSD circuit 71 so that the images of the commercials CM11-1-1 to 11-1-9 are attached to the periphery of the image of the reduced screen size.

When it is determined at the step S27 that a reduction of the screen size has not been specified, the process at the step S28 is skipped.

At a step S29, the CPU 67 performs processing to switch from the stream of the television program P1 to the stream of the empty space E. Thus, the sports scene P1-2 is displayed following the sports scene P1-1. When the screen size of the sports scene P1-2 is small, the commercials CM11-1-1 to 11-1-9 are displayed around the periphery of the sports scene P1-2.

At a step S30, the CPU 67 waits until the time for ending the commercial CM1 (that is, the time t2) arrives. When the time has arrived, the process proceeds to a step S31, where the CPU 67 receives a signal respecifying the screen size set at the step S12 on the transmitting side. At a step S32, the CPU 67 changes the screen size to the original screen size corresponding to the specification. At a step S33, the CPU 67 switches from the stream of the empty space E to the stream of the television program P1. Thus, the sports scene P1-3 is displayed.

When it is determined at the step S25 that the viewer of the hard disk recorder 51 has not taken out a subscription to skip the commercial, the process from the step S26 to the step S33 is skipped. More specifically, in this case, the stream of the television program P1 is reproduced without the above processing; therefore, the commercial CM1 is displayed following the sports scene P1-1, and then the sports scene P1-3 is displayed.

The series of process steps described above may be carried out not only by hardware but also by software. When the series of process steps is to be carried out by software, a program is installed from a network or a recording medium onto a computer where programs forming the software are incorporated in dedicated hardware, or a general-purpose personal computer that can perform various functions by installing various programs thereon, for example.

Examples of the recording medium include not only program-recorded packaged media distributed to users to provide the program separately from the apparatus proper, such as the magnetic disks 22 and 74 (including a floppy disk), the optical disks 23 and 75 (including CD-ROM (Compact Disk-Read Only Memory) and DVD (Digital Versatile Disk)), the magneto-optical disks 24 and 76 (including MD (Mini-Disk)) or the semiconductor memories 25 and 77, as shown in FIG. 1 or FIG. 2, but also a ROM and the hard disk drive 65 storing the program and supplied to a user in a state of being preincorporated in the apparatus proper.

It is to be noted that in the present specification, the steps describing the program recorded on a recording medium include not only process steps carried out in time series in the described order, but also process steps carried out in parallel or individually and not necessarily in time series.

In the present specification, a system refers to an apparatus as a whole formed by a plurality of units.

As described above, the apparatus and the method for multiplexing and the program on a recording medium according to the present invention select a second material in place of a first material as a material of a first stream and select the first material as a material of a second stream during a specified period of time. Therefore, it is possible to allow a viewer to continuously view desired streams as required.

The apparatus and the method for image output and the program on a recording medium according to the present invention select a second stream in place of a first stream during a specified period of time such that an image of a first material included in the second stream is displayed as an image of a smaller area than that of an image of the first material included in the first stream. Therefore, it is possible to display the image of the first material in real time.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A multiplexing apparatus for multiplexing a first stream and a second stream for output, said multiplexing apparatus comprising:

a first selecting unit having a first input operable to receive first content and a second input operable to receive second content, and being operable to select a given one of the first content and the second content as the first stream and to output another given one of the first content and the second content to a second selecting unit;

said second selecting unit having a first input operable to receive the output from said first selecting unit and having a second input operable to receive the second content, and being operable to select between the output received from said first selecting unit and the second content received from said second input of said second selecting unit as the second stream;

a control unit operable to control said first selecting unit to select the first content as the first stream until a first predetermined time, to select the second content as the first stream and to output the first content to said second selecting unit during an interval between the first predetermined time and a second predetermined time, and to again select the first content as the first stream after the second predetermined time; said control unit being further operable to control said second selecting unit to select the second content as the second stream until the first predetermined time, to select the first content received from said first selecting unit as the second stream during the interval between the first predetermined time and the second predetermined time, and to again select the second content as the second stream after the second predetermined time; and a multiplexing unit operable to multiplex the first stream and the second stream for delivery over a transmission channel.

2. A multiplexing apparatus as claimed in claim 1, wherein the transmission channel has a maximum bandwidth, and said control unit is further operable to control a bit rate of the second stream without limiting a bit rate of the first stream such that the combined bit rate of the first and second streams are at most equal to the maximum value.

3. A multiplexing apparatus as claimed in claim 1, wherein the second content is a commercial.

4. A multiplexing apparatus as claimed in claim 1, further comprising a third selecting unit having a first input operable to receive third content and having a second input operable to receive the second content, said third selecting unit being operable to select between the second content and the third content as a third stream, said multiplexing unit operable to multiplex the first stream, the second stream, and the third stream.

5. A method for multiplexing a first stream and a second stream for output, said method comprising:

inputting a first content and a second content;

selecting the first content as the first stream and the second content as the second stream until a first predetermined time;

selecting the second content as the first stream and the first content as the second stream during an interval between the first predetermined time and a second predetermined time;

selecting the first content as the first stream and the second content as the second stream after the second predetermined time; and multiplexing the first stream and the second stream for delivery over a transmission channel.

6. A computer readable medium recorded with a program for carrying out a method of multiplexing a first stream and a second stream for output, said method comprising:

inputting a first content and a second content;

selecting the first content as the first stream and the second content as the second stream until a first predetermined time;

selecting the second content as the first stream and the first content as the second stream during an interval between the first predetermined time and a second predetermined time;

selecting the first content as the first stream and the second content as the second stream after the second predetermined time; and multiplexing the first stream and the second stream for delivery over a transmission channel.

7. An image output apparatus, comprising:
a front end unit operable to receive a signal that includes a first stream and a second stream;
a selecting unit operable to select one of the first stream and the second stream;
a control unit operable to control said selecting unit to select the first stream until a first predetermined time, to select the second stream during an interval between the first predetermined time and a second predetermined time, and to again select the first stream after the second predetermined time, the first stream being first content until the first predetermined time and after the second predetermined time and being second content during the interval between the first predetermined time and the second predetermined time, the second stream being the first content during the interval between the first predetermined time and the second predetermined time; and
an output unit operable to output the selected one of the first stream and the second stream whereby the first content is continuously outputted.

8. An image output apparatus as claimed in claim 7, wherein said control unit is further operable to control said selecting unit to also select the first stream during the interval between the first predetermined time and the second predetermined time such that the first content is displayed during the interval as an image of a specified area that is smaller than a full screen display area and the second content is concurrently displayed as an image having an area smaller than the specified area.

9. An image output method, comprising:
receiving a signal that includes a first stream and a second stream;
selecting a given one of the first stream and the second stream;
controlling said selecting step to select the first stream until a first predetermined time, to select the second stream during an interval between the first predetermined time and a second predetermined time, and to again select the first stream after the second predetermined time, the first stream being first content until the first predetermined time and after the second predetermined time and being second content during the interval between the first predetermined time and the second predetermined time, the second stream being the first content during the interval between the first predetermined time and the second predetermined time; and
outputting the selected one of the first stream and the second stream whereby the first content is continuously outputted.

10. A computer readable medium recorded with a computer readable program for carrying out a method of controlling an image output, said method comprising:
receiving a signal that includes a first stream and a second stream;
selecting a given one of the first stream and the second stream;
controlling said selecting step to select the first stream until a first predetermined time, to select the second stream during an interval between the first predetermined time and a second predetermined time, and to again select the first stream after the second predetermined time, the first stream being first content until the first predetermined time and after the second predetermined time and being second content during the interval between the first predetermined time and the second predetermined time, the second stream being the first content during the interval between the first predetermined time and the second predetermined time; and
outputting the selected one of the first stream and the second stream whereby the first content is continuously outputted.

11. A multiplexing apparatus as claimed in claim 2, wherein said control unit is further operable to control the bit rate of the second stream by controlling a screen size associated with the second stream.

12. A method as claimed in claim 5, wherein the transmission channel has a maximum bandwidth, and said method further comprises: controlling a bit rate of the second stream without limiting a bit rate of the first stream such that the combined bit rate of the first and second streams are at most equal to the maximum value.

13. A method as claimed in claim 12, wherein said controlling step includes controlling the bit rate of the second stream by controlling a screen size associated with the second stream.

14. A method as claimed in claim 5, wherein the second content is a commercial.

15. A method as claimed in claim 5, further comprising: receiving third content, and selecting between the second content and the third content as a third stream; and wherein said multiplexing step includes multiplexing the first stream, the second stream, and the third stream.

16. An image output apparatus as claimed in claim 7, wherein the second stream is second content before the first predetermined time, and said image output apparatus further comprises a recording device operable to record the second content before the first predetermined time and to playback the second content during the interval between the first predetermined time and the second predetermined time such that the first content is displayed as an image of a specified area that is smaller than a full screen display area and the second content is concurrently displayed as an image having an area smaller than the specified area.

17. An image output method as claimed in claim 9, further comprising: controlling said selecting step to also select the first stream during the interval between the first predetermined time and the second predetermined time such that the first content is displayed during the interval as an image of a specified area that is smaller than a full screen display area and the second content is concurrently displayed as an image having an area smaller than the specified area.

18. An image output method as claimed in claim 9, wherein the second stream is second content before the first predetermined time, and said method further comprises: recording the second content before the first predetermined time and playing back the second content during the interval between the first predetermined time and the second predetermined time such that the first content is displayed as an image of a specified area that is smaller than a full screen display area and the second content is concurrently displayed as an image having an area smaller than the specified area.

* * * * *